United States Patent [19]

Järvineva

[11] 4,432,515

[45] Feb. 21, 1984

[54] LIQUID FUEL TANK FOR AN AIRPLANE AND METHOD AND APPARATUS FOR MANUFACTURING THE SAME

[75] Inventor: Elias A. Järvineva, Halli, Finland

[73] Assignee: Valmet Oy, Finland

[21] Appl. No.: 243,504

[22] Filed: Mar. 13, 1981

[51] Int. Cl.³ .............................................. B64C 3/34
[52] U.S. Cl. ................................. 244/123; 244/135 R
[58] Field of Search ................. 244/123, 135 R, 133; 220/900, 453, 444, 445, 448

[56] References Cited

U.S. PATENT DOCUMENTS

| | | | |
|---|---|---|---|
| 2,407,515 | 9/1946 | Roberts | 220/900 |
| 2,620,963 | 12/1952 | Hagopian | 220/453 |
| 3,135,486 | 6/1964 | Wing | 244/123 |
| 3,176,775 | 4/1965 | Clemens | 244/133 |
| 3,317,074 | 5/1967 | Barker et al. | 220/453 |
| 3,506,224 | 4/1970 | Harr et al. | 244/135 R |
| 3,779,487 | 12/1973 | Ashton et al. | 244/123 |
| 3,929,247 | 12/1975 | Borup | 220/453 |

FOREIGN PATENT DOCUMENTS

| | | | |
|---|---|---|---|
| 655793 | 4/1929 | France | 244/135 R |
| 834617 | 11/1938 | France | 244/135 R |
| 1293705 | 4/1967 | France | 244/135 R |
| 644181 | 10/1950 | United Kingdom | 244/135 R |

Primary Examiner—Galen L. Barefoot
Attorney, Agent, or Firm—Steinberg & Raskin

[57] ABSTRACT

A liquid fuel tank for an airplane of the type which constitutes a structural part of the airplane wing, the outer surface of which defines the aerodynamic outer surface of at least a portion of the wing, includes walls having a bonded multilayer sandwich structure having sufficient rigidity and strength while being devoid of internal and external reinforcing structure. The sandwich structure includes an inner liquid-tight tank formed of thin sheet material, an intermediate core layer formed of a cellular material or the like bonded to the outer surface of the tank, and an outer shell layer formed of sheet material bonded to the outer surface of the intermediate layer. The outer surface of the outer layer constitutes the aerodynamic outer surface of at least a portion of the airplane wing. The liquid tank is manufactured by enclosing an inner liquid-tight tank in an intermediate core layer of cellular material or the like, enclosing the intermediate core layer in an outer shell layer formed of sheet material and bonding the intermediate core layer to the inner tank and the outer shell layer to the intermediate core layer in a die cavity of a die tool which defines an inner surface which corresponds in shape to the outer surface of the liquid tank and the aerodynamic outer surface of at least a portion of the airplane wing. In this manner, the outer surface of the outer shell layer will correspond in shape to the aerodynamic outer surface of the airplane wing.

9 Claims, 3 Drawing Figures

LIQUID FUEL TANK FOR AN AIRPLANE AND METHOD AND APPARATUS FOR MANUFACTURING THE SAME

BACKGROUND OF THE INVENTION

The present invention relates generally to liquid fuel tanks for airplanes and, more particularly, to liquid fuel tanks for airplanes which constitute a structural part of the airplane wing and which have an outer surface which defines the aerodynamic outer surface of at least a portion of the airplane wing, and methods and apparatus for manufacturing the same.

Airplane fuel tanks are subject to several special design requirements. For example, efficient utilization should be made of the structural space available. In this connection, in view of fire safety considerations as well as considerations relating to the location of the centroid, the tanks are usually situated in the airplane wings where, however, only limited structural space is available. Accordingly, the walls of the tank should preferably coincide with the outer cladding of the wing so that the best possible utilization of the available structural space can be achieved.

Additionally, an airplane fuel tank must be both strong and light. Thus, the tank must be sufficiently strong so as to tolerate the fatigue loads resulting from the motion of the airplane and from the liquid fuel splashing. Accordingly, the tank is desirably constructed of relatively thick sheet metal which is not prone to buckling or fatigue.

On the other hand, since it is quite important to reduce the flight mass of the airplane to a minimum, there is a tendency to use the thinnest possible sheet metal in the construction of the fuel tank. However, such construction subjects the tank to the possibility of failing through fatigue.

Furthermore, the fuel tank should be easily accessible to allow for servicing. In this connection, the tank should be detachable from the associated structure or at least provided with adequate servicing doors or the like. Structural provisions should be made to minimize or prevent the possibility of fuel leakage resulting from accidents, flying debris and the like. Of course, it is important to reduce the risk of major ruptures in the fuel tank which might occur during a crash of the aircraft.

Several different varieties of airplane fuel tanks are currently in use. For example, fuel tanks constructed by welding light sheet metal material and which are fixed within the airplane wing by means of metallic straps have been used for many years and, in fact, are still in use in some propeller driven airplanes. The advantages of such fuel tanks are that the same are detachable to facilitate servicing and are inexpensive in construction. However, such fuel tanks do not efficiently utilize the space within the wing since it is not possible to locate the tank as close as would be desired to the outer cladding of the wing. It has been suggested that such tanks present a safety hazard in that they are liable to burst or at least leak in the event of a crash or other accident. Furthermore, such tanks are relatively heavy since the outer cladding of the airplane does not contribute to the strength of the tank.

Another conventional airplane fuel tank currently in use is the so-called "integral tank". Such integral tanks include compartments confined by the cladding sheet and by the wing ribs, the cladding and ribs having been riveted using sealing compounds to define a liquid-tight tank. Integral tanks are presently the most common tank structure being used in relatively thick-skinned commercial and military airplanes. Such tanks are advantageous in that efficient use of available space is provided in combination with a relatively light weight of the structure. However, such integral tanks have drawbacks such, for example, difficulty in servicing since such tanks are not detachable and the necessity of placing sealing compounds when repairs to the tank are required. Furthermore, integral tanks are relatively prone to developing leaks due to flying debris or the like when used in relatively thin skinned, small airplanes. Still further, to obtain reliable liquid tightness for the tank requires close attention during the construction of the tank, while otherwise the interior structure need not be smooth.

Another type of airplane fuel tank presently in use is the rubber bag tank. In the use of such rubber bag tanks, a smooth-walled space, which need not be liquid-tight, is formed through the interconnection of the outer cladding and the ribs in the wing. A thin rubber bag is introduced into this space through a servicing hatch and bosses provided on the bag are pushed into openings provided in the interior space within the wing. Such rubber bag tanks have been in common use since the 1950's both in military and in small airplanes. The advantages of such rubber bag tanks include relatively good space utilization and safety from damage against both flying debris and in the event of a crash. The tank is also quite strong since the inner space and surrounding structure operate at a single entity. However, among the drawbacks of rubber bag tanks are that the rubber bags must be periodically replaced after a certain number of years and that the bags must be constructed utilizing special molds. Furthermore, the provision of rubber bags of course results in extra weight being added to the aircraft.

Airplane fuel tanks are also known which include a combination of the features discussed above. For example, fuel tanks comprising a hybrid of integral and welded tanks are relatively common in small planes. Typically, a tank of this type has a welded structure and is detachably connected to the surrounding structure by threaded fasteners. A portion of an outer surface of such tanks has been utilized to form a part of the wing's aerodynamic outer surface. The advantages and drawbacks of such hybrid tanks are essentially the same as those discussed above in connection with the integral and welded tanks.

The state of the art in connection with fuel tanks of the type described above is disclosed in U.S. Pat. No 3,420,477 wherein the fuel tank has a multi-ply wall which coincides with the wing cladding. However, in the construction of the fuel tank disclosed in this patent, the wall of the wing which functions at the same time as the wall of the fuel tank does not comprise a sandwich structure in the same sense as that term is used in connection with the present invention as described in greater detail hereinbelow. More particularly, a plurality of reinforcements and bracing elements are required in the construction of the fuel tank disclosed in U.S. Pat. No. 3,420,477. Such reinforcing and bracing elements complicates the construction of the tank and renders the same quite difficult since, for example, it is necessary to provide riveted joints at locations to which access is difficult. Due to the presence of the numerous reinforcing and bracing elements within the interior of the tank, such tanks cannot be manufactured by the method of the present invention described in detail below. Furthermore, the presence of the bracing and reinforcing elements detract from the space available within the tank for accommodating fuel. Still further, a risk of fuel leakage is introduced through the use of riveted joints necessitated by the bracing and reinforcing elements.

SUMMARY OF THE INVENTION

Accordingly, one object of the present invention is to provide new and improved liquid fuel tanks for airplanes and methods and apparatus for manufacturing the same.

Another object of the present invention is to provide new and improved liquid fuel tanks for airplanes of the type which constitute a structural part of the airplane wing and which have an outer surface which defines the aerodynamic outer surface of at least a portion of the airplane wing.

Still another object of the present invention is to provide new and improved liquid fuel tanks for airplanes which efficiently utilize available space.

A further object of the present invention is to provide new and improved liquid fuel tanks for airplanes which are extremely light and yet exceedingly strong.

A still further object of the present invention is to provide new and improved liquid fuel tanks for airplanes which are extremely safe, i.e., wherein the possibility of leaks developing from flying debris or after a crash is reduced.

Briefly, in accordance with the present invention, these and other objects are attained by providing a liquid fuel tank which is defined by walls having a multi-ply bonded sandwich sheet structure which has sufficient rigidity in strength while being devoid of internal and external reinforcing structure. More particularly, the sandwich structure includes an inner liquid-tight tank formed of thin aluminum sheet material or the like, an intermediate core layer formed of foamed plastic or other suitable cellular material, and an outer shell layer formed of sheet material, such as aluminum or the like, which at the same time constitutes the aerodynamic outer surface of at least a part of the wing.

A method for manufacturing a liquid fuel tank according to the present invention includes the steps of providing an inner liquid-tight tank formed of thin sheet material, enclosing the inner tank in an intermediate core layer formed of a cellular material or the like, enclosing the intermediate core layer in an outer shell layer formed of sheet material, interposing adhesive material between the three layers, i.e., the inner tank, the core layer and the shell layer, in one or several steps. The blank is then bonded so that the intermediate core layer is bonded to the inner tank and the outer shell layer is bonded to the intermediate core layer in a manner such that the outer surface of the outer shell layer corresponds in shape to the aerodynamic outer surface of at least a portion of the airplane wing.

According to the invention, the bonding step is accomplished by placing the various components into the die cavity of a die tool, the inner surface of which corresponds to the outer surface configuration of the completed tank. In order to produce the pressure required in the bonding step or steps of the multi-ply structure, the interior of the inner tank is pressurized whereupon the die cavity imparts to the tank the precise shape desired and, if required, the proper adhesive curing temperature.

According to the invention, a die tool for use in connection with manufacturing the fuel tank of the invention is provided which is characterized in that the die tool comprises a body member having a die cavity defining inner surfaces which corresponds to the ultimate external configuration of the completed fuel tank, the die cavity being closable by means of end pieces. Apparatus for controlling the temperature of the die tool are provided and in the illustrated embodiment comprises a heating pipe system or electrical resistance means.

An essential feature of the liquid fuel tank of the present invention is that the walls thereof comprise sandwich sheet structure which provides sufficient rigidity in strength while being devoid of any internal or external reinforcing structure. Only by this feature is it possible to utilize the particular manufacturing method of the invention wherein the requisite bonding pressure can be obtained through the pressurization of the inner tank while the die cavity imparts the correct configuration to the tank. More particularly, if it were necessary to utilize internal reinforcing or bracing elements, the pressurization of the inner tank would fail to produce a uniform bonding pressure. Rather, discontinuities would be found at the location of the reinforcing elements which would detract from the strength of the sandwich structure. A further advantage obtained by providing the sandwich structure of the present invention, i.e., a multi-ply structure which is devoid of at least internal reinforcement and bracing elements is that an increased fuel capacity is obtained as well as a simpler construction and improved liquid-tightness and sealing of the tank.

The liquid fuel tank of the present invention provides superior space utilization relative to that of a rubber bag tank of the type described above and substantially as good as in the case of an integral tank. The tank of the present invention is light and exceedingly strong and the total mass thereof in the sandwich sheet construction is less than that of an equivalent rubber bag tank. Furthermore, tanks constructed according to the present invention are safer in operation than conventional tanks.

Similarly, the tank of the present invention is superior to conventional tanks of the welded type including those which utilize respective areas of the wing cladding. Thus, such welded tanks generally have a greater total mass while being clearly inferior in strength and safety to the tank of the present invention. By virtue of its inherent rigidity and strength, the tank of the present invention can serve as a stepping area on the wing without the need of any additional reinforcements which could be achieved only by the rubber bag type tanks previously.

The fact that the tank of the present invention is safer in operation than conventional tanks results from the fact that the core material of the sandwich structure together with the outer shell layer attenuate the impacts from flying debris and prevents major ruptures from occuring in a crash. The tight sealing of the tank of the present invention does not depend on any sealing compound. Due to the sandwich structure of the tank, the aerodynamic shape of the outer wing surface obtained by the tank of the invention is superior to that in connection with the tanks of the prior art.

It is recognized that repairs of major damage to the sandwich structure of the tank of the present invention is difficult. However, the construction of the fuel tank renders the same amenable to be provided in a removable and replaceable fashion, such as by a screw-type attachment to the wing. Of course, minor leaks may be repaired using the same sealing compounds as used in connection with integral tanks described above. It is also pointed out that the bonding of the various layers of the tank according to the present invention requires a degree of care being exercised as well as a relatively clean working environment.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which.

DESCRIPTION OF THE PREFERRED EMBODIMENTS

Figure 1:
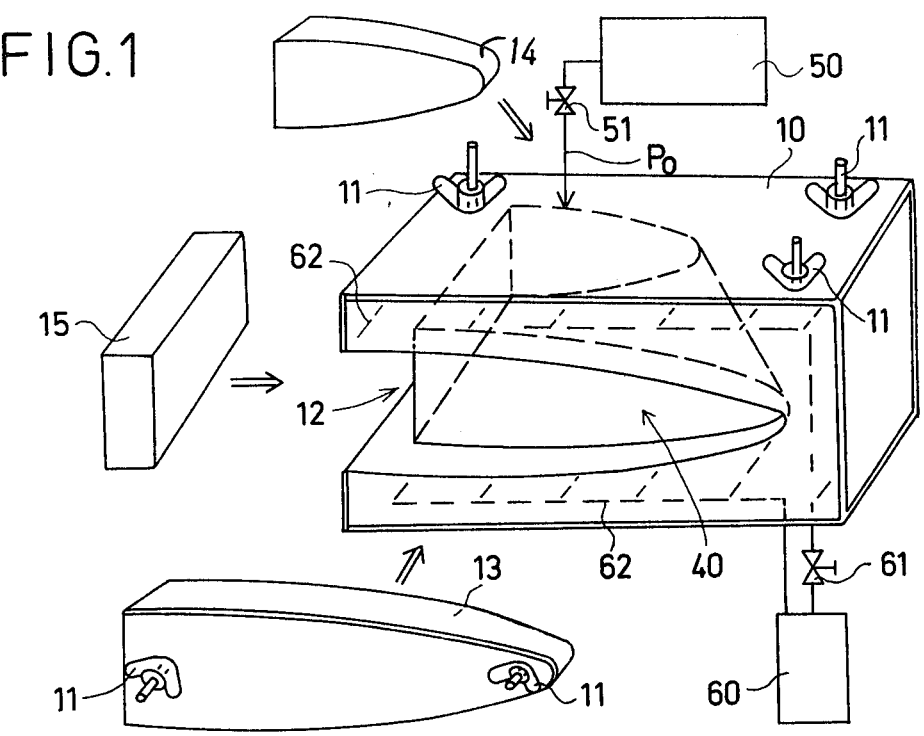
FIG. 1 is a schematic perspective view in exploded form illustrating the die tool used in connection with the method of manufacturing a liquid fuel tank according to the present invention.

Referring now to the drawings wherein like reference characters designate identical or corresponding parts throughout the several views, and more particularly to FIG. 1, a die tool 10 according to the present invention includes a body member having a die cavity 12 defining an inner surface which corresponds in shape to the aerodynamic outer surface of at least a portion of the airplane wing. The die tool 10 further comprises the removable wall elements 13, 14 and 15 which are attachable to the body member by screws 11 or the like to close the die cavity 12. It will be understood by those skilled in the art that various implements for supporting structures may be utilized in order to close the die cavity.

A pressure tank 50 is provided, which may constitute a tank of compressed gas, for pressurizing the interior of a fuel tank blank 40 situated within the die cavity 12 to a pressure $P_O$ as more fully described hereinbelow in connection with the method of the present invention.

A system of pipes 62 are provided within the body member of die tool 10 as schematically shown in FIG. 1 through which a temperature-controlled fluid is circulated to maintain the die tool at a given temperature, if necessary, during the various bonding steps of the method of the invention in order to effect curing of the adhesive. A heater and associated circulation pump 60 communicates with the pipe system 62 through a control valve 61. Alternatively, electrical resistance heaters may be utilized in order to control the temperature of the die tool.

Figure 2:
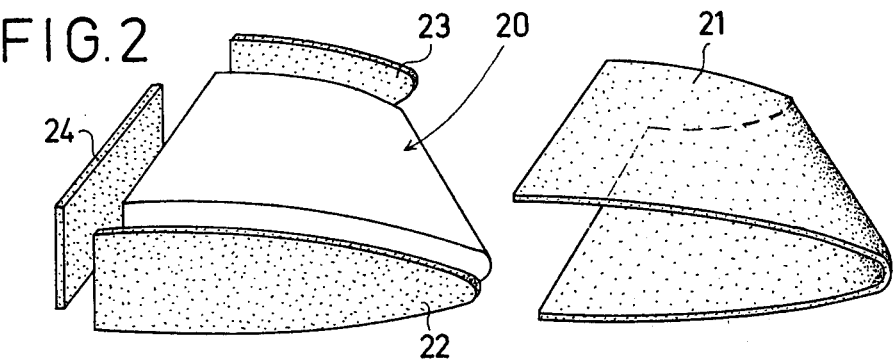
FIG. 2 illustrates the first bonding step of the method of the present invention wherein the intermediate core layer is bonded to the inner tank.

Referring to FIG. 2, the fuel tank of the present invention is constructed of an inner tank 20 formed of thin sheet material, such as sheet aluminum, appropriately welded so as to be liquid-tight. The inner tank 20 is enclosed and bonded to an intermediate core layer formed of a cellular material such as a rigid foamed plastic or the like and which includes planar wall elements 22, 23 and 24 and a pre-formed substantially U-shaped core material member 21. For example, the core layer may comprise a rigid, light foamed plastic material having a thickness of about 12 mm.

Figure 3:
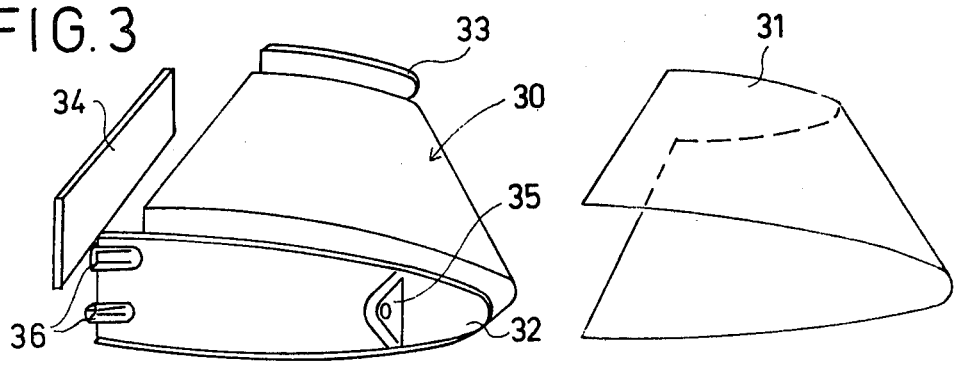
FIG. 3 illustrates the second bonding step of the method of the present invention wherein the outer shell layer is bonded to the intermediate core layer.

In one embodiment of the method of the present invention, the core layer comprising the core material pieces 21, 22, 23 and 24 is first bonded to the outer surface of the inner tank 20 in the die tool 10 illustrated in FIG. 1. More particularly, the inner tank 20 is situated in the die cavity 12 whereupon the tank is enclosed by the intermediate core layer 21, 22, 23 and 24 with adhesive interposed therebetween. A fixture member (not shown) having an appropriate configuration corresponding to that of an outer shell member 31 illustrated in FIG. 3 is situated over the U-shaped core member 21. At this time the die cavity is closed by wall elements 13, 14 and 15 and the interior of the inner tank pressurized, such as by interconnecting pressure tank 50 with a breather pipe communicating with the interior of tank 20 whereupon a sufficient bonding pressure is created to effect the bonding of the intermediate core layer to the inner tank 20. The temperature of the die tool 10 may be raised to an appropriate level in order to effect curing of the adhesive interposed between the inner tank and the intermediate core layer. After this first bonding step, the fixture member is removed.

The first bonding step described above results in the formation of an intermediate tank blank 30 (FIG. 3) constituted by the inner tank 20 and intermediate core layer 21, 22, 23 and 24 bonded thereto. A second bonding step is then performed wherein the tank blank 30 is enclosed in an outer shell layer with an adhesive interposed therebetween. As seen in FIG. 3, the outer shell layer includes shell plates 31, 32, 33 and 34 formed of thin sheet material such, for example, as aluminum sheet material, on which lugs 35 and 36 may be pre-mounted. The tank blank 30 is thus placed in the die cavity 12 of die tool 10 along with the outer shell layer whereupon the interior of the inner tank 20 is pressurized in the same manner as described above in connection with the first bonding step. Such pressurization provides the requisite bonding pressure by forcing the tank components against the inner surface of the die cavity to impart the desired shape to the tank as in the case of the first bonding step. It is noted in this connection that the fixture member utilized in the first bonding step in order to properly space the pre-formed U-shaped core member 21 from the inner surface of the die cavity is no longer necessary. Further, the absence of internal reinforcing and bracing elements assures that a uniform pressure is obtained over the entire surfaces of the layers being bonded. The pressure $P_O$ may, for example, be about one bar. The temperature of the die cavity may be raised to an appropriate extent through the pipe system 62 in order to effect curing of the adhesive interposed between the outer shell layer and the intermediate core layer. Completion of the second bonding step results in the finished liquid fuel tank of the present invention.

The method of the present invention has been described above as including two separate bonding steps. However, it is understood that the two bonding steps may be combined into a single bonding step wherein the bonding pressure is produced in both adhesive layers in a single pressurization step within die tool 10. More particularly, the inner tank 20 is situated within the die cavity 12 whereupon it is enclosed in the intermediate core layer 21, 22, 23 and 24 with adhesive interposed therebetween. The intermediate core layer is then enclosed in the outer shell layer 31, 32, 33 and 34 and the die cavity closed by the wall elements 13, 14 and 15. The inner tank 20 is then pressurized to obtain the necessary bonding pressure and the temperature of the die tool raised to the curing temperature, if necessary, whereupon the core layer is bonded to the inner tank and the shell layer is bonded to the core layer.

It is noted that when the bonding operation is accomplished in a single step, it is not necessary to utilize the fixture member as in the case of the first bonding step described above.

It is an essential feature in the method of the present invention that after the die tool 10 has been closed a pressure is introduced into the interior of the inner tank 20 whereby the outer walls of the tank blank tend to inflate against the inner walls of the die cavity 12 so that an exact outer shape conforming to that of the die cavity is obtained. The pressure and temperature are controlled as required by the surface and core materials employed.

The die tool 10 may be formed of any suitable material such, for example, as reinforced concrete, casting plastic or the like and the heating pipe system 62 or equivalent electrical resistance heating wires embedded within the cast structure. It is of course recognized that additional intermediate finishing steps may be required in the construction of the fuel tank of the present invention as will be understood by those skilled in the art.

The term "sandwich sheet structure" is utilized herein to refer to a structure which is sufficiently rigid and strong for the intended purpose while being devoid of any internal or external reinforcing elements and that the liquid fuel tank of the present invention as well as the method for manufacturing the same cannot be obtained if a sandwich structure is used which is so thin as to require the use of special reinforcing and bracing elements and, in particular, bracing elements situated internally therein. Such multi-ply structures which are braced with reinforcing and/or bracing elements do not constitute sandwhich structures in the sense in which this term has been utilized in the instant application.

The fuel tank of the present invention is preferably situated in connection with the front edge at the root of both wings of the aircraft. The tank preferably has a configuration of a trapezoid when viewed in a direction at right angles to the principle plane of the aircraft. This shape tends to even further add to the strength of the tank.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. In a liquid fuel tank for an airplane of the type which constitutes a structural part of the airplane wing and having an outer surface which defines the aerodynamic outer surface of at least a portion of the airplane wing, the improvement comprising:
the liquid fuel tank being defined by walls having a bonded multi-layer sandwich structure having sufficient rigidity and strength while devoid of internal and external reinforcing structure, the sandwich structure including an inner liquid-tight tank formed of thin metallic sheet material, an intermediate core layer formed of a cellular rigid foam plastic material bonded to the outer surface of the inner tank, and an outer shell layer formed of metallic sheet material bonded to the outer surface of the intermediate layer, the outer surface of the outer layer constituting the aerodynamic outer surface of at least a portion of the airplane wing, and wherein said sandwich structure as a unitary structural entity constitutes a load bearing member.

2. The combination of claim 1 wherein the inner tank is formed or thin aluminum sheet material welded so as to be liquid-tight, and the outer layer is formed of aluminum sheet material.

3. A method for manufacturing a liquid fuel tank for an airplane of the type which constitutes a structural part of the airplane wing and having an outer surface which defines the aerodynamic outer surface of at least a portion of the airplane wing, comprising the steps of:
providing an inner liquid-tight tank formed of thin metallic sheet material;
substantially entirely enclosing the inner liquid-tight tank in an intermediate core layer formed of a cellular rigid foam plastic material with adhesive provided between the outer surface of said inner liquid-tight tank and the inner surface of said intermediate core layer;
substantially entirely enclosing the intermediate core layer in an outer shell layer formed of metallic sheet material with adhesive provided between the outer surface of said intermediate core layer and the inner surface of said outer shell layer;
bonding the intermediate core layer to the inner tank and the outer shell layer to the intermediate core layer by placing the same in one or more steps in the die cavity of a die tool having an inner surface which corresponds in shape to the outer surface of the liquid tank and the aerodynamic shape of the outer surface of at least a portion of the airplane wing and pressurizing the interior of the inner tank to provide a bonding pressure.

4. The method of claim 3 wherein said bonding step includes situating the inner tank in the die cavity of the die tool, enclosing the tank in the intermediate core layer with adhesive interposed therebetween, the intermediate core layer including a preformed substantially U-shaped member, situating a fixture member over the U-shaped member, pressurizing the interior of the inner tank to provide an appropriate bonding pressure whereby the core layer is bonded to the inner tank, removing the fixture member whereupon the intermediate core layer is enclosed in the outer shell layer with adhesive interposed therebetween, and pressurizing the interior of the inner tank whereby the outer shell layer is bonded to the intermediate core layer.

5. The method of claim 3 wherein said bonding step includes situating the inner tank in the die cavity of the die tool, enclosing the tank in the intermediate core layer with adhesive interposed therebetween, enclosing the intermediate core layer in the outer shell layer with adhesive interposed therebetween, and pressurizing the interior of the inner tank whereby the core layer is bonded to the inner tank and the shell layer is bonded to the core layer.

6. The method of claim 3 wherein said core layer includes substantially planar end pieces and a preformed substantially U-shaped member.

7. The method of claim 6 wherein said shell layer includes substantially planar end pieces and a preformed substantially U-shaped member.

8. The method of claim 3 further including the step of heating the die cavity to an appropriate bonding temperature during the bonding step.

9. In a liquid fuel tank for an airplane of the type which constitutes a structural part of the airplane wing and having an outer surface which defines the aerodynamic outer surface of at least a portion of the airplane wing, the improvement comprising:

the liquid fuel tank being defined by walls having a bonded multi-layer sandwich structure having sufficient rigidity and strength while devoid of internal and external reinforcing structure, the sandwich structure including an inner liquid-tight tank formed of thin metallic sheet material, an intermediate core layer formed of a cellular rigid foam plastic material bonded to substantially the entire outer surface of the inner liquid-tight tank, and an outer shell layer formed of metallic sheet material bonded to substantially the entire outer surface of the intermediate layer, the outer surface of the outer layer constituting the complete aerodynamic outer surface of at least a portion of the airplane wing, the liquid fuel tank thereby constituting a structural or load-bearing part of the airplane wing, and wherein said sandwich structure as a unitary structural entity constitutes a load bearing member.

* * * * *